J. Mead,
Cotton Press.
Nº 5,235.   Patented Aug. 14, 1847.

UNITED STATES PATENT OFFICE.

MARY ANN MEAD, OF AURORA, INDIANA, ADMINISTRATRIX OF JAS. MEAD, DECEASED.

IMPROVEMENT IN PACKING AND PRESSING COTTON

Specification forming part of Letters Patent No. 5,235, dated August 14, 1847.

*To all whom it may concern:*

Be it known that JAMES MEADE, of Aurora, in the county of Dearborn and State of Indiana, did invent a new and useful Machine for Pressing Cotton into Bales; and I do hereby declare that the following is a full, clear, and exact description of the construction and operation of the same, reference being had to the annexed drawings, making a part of this specification, in which—

Figure 1:
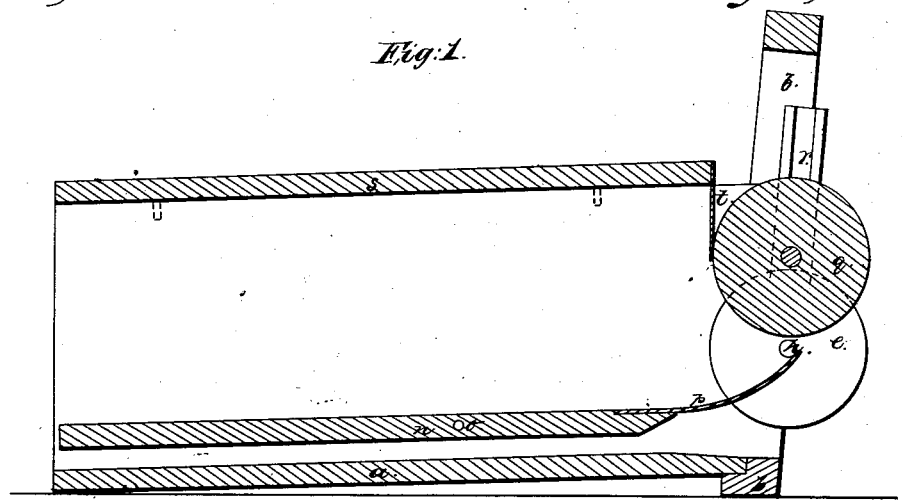
Figure 2:
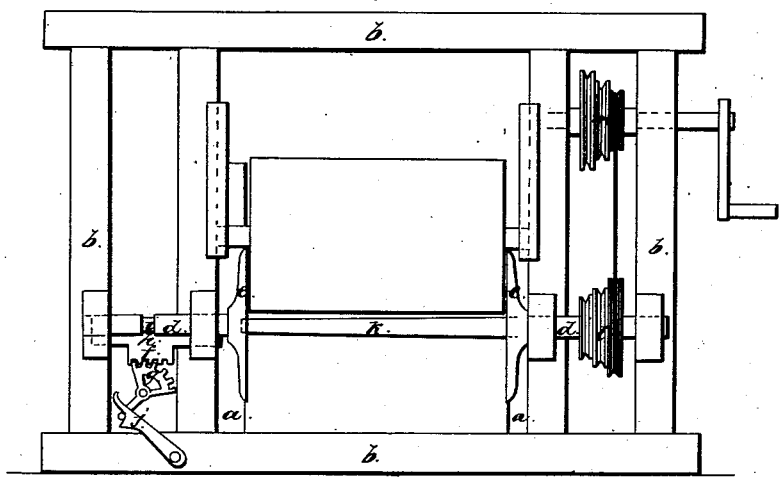

Figure 1 is a longitudinal section. Fig. 2 is a front elevation.

The main feature of the invention consists in an arrangement for pressing cotton into a uniformly dense mass, as it is gathered by small increments around a spindle, more effectually and with much less expenditure of power than is commonly employed to press the whole bale at once.

$a$ is a wooden box to receive and transmit the cotton, and is attached to a frame, $b$. This frame carries two shafts, $c$ $d$, bearing disks $e$, which revolve with them. The shaft $c$ can be slid to and fro by the rack $f$ and pinion $g$, the rack having a lug, $h$, working in a collar, $i$, in the shaft.

$j$ is a catch to hold the shaft to its work. A spindle, $k$, with square extremities fits into corresponding sockets in the disks; but can be withdrawn by shifting the shaft $c$ back. This rod or spindle is tapered to facilitate its withdrawl from the bale. The shaft $d$ has a pulley, $l$, connected by strap with another pulley, $m$, where the motive power is applied.

$n$ is a table resting on pivots $o$ attached to the sides of the box. Its back end is heaviest, and it is furnished at the front end with a strong spring, $p$, extending its whole width and pressing the under side of the rod $k$. A heavy roller, $q$, working in slides $r$, creates a pressure on the other side of the rod or spindle. There is a lid, $s$, to the box having attached to its inner end, a plate of iron, $t$, which, bears against the roller and keeps the cotton, from flying out.

Operation: Having inserted the rod or spindle in the disks and secured the shaft $c$ to its place, set the machine in motion, and either supply the cotton by hand or place the box so as to receive it from the "gin." The rod, in revolving, will gather the cotton around it under pressure from the roller and table, and thus form a bale of great and uniform density, which, when as large as required, is taken out by shifting back the shaft $c$. The rod is then drawn and, being reinstated in the machine, is ready for another bale.

What I claim therein as new, and desire to secure by Letters Patent, is—

The within-described apparatus for forming a bale of cotton under pressure on a spindle or revolving rod; but I do not intend by this specification to limit myself to the precise arrangement herein described, so long as I attain the same end by equivalent means; for instance, the pressure of the roller may be increased by the aid of levers, or the hydraulic cylinder, and gearing or a pair of conical pulleys may be applied to adapt the power to the increased size of the bale, &c.; also, the rod may be of several pieces, to facilitate its withdrawal, and an endless apron may be applied to the table.

MARY ANN MEAD. [L. S.]

Attest:
J. L. CAMPBELL,
WILLIAM T. HARRIS.